US009760546B2

United States Patent
Galle

(10) Patent No.: US 9,760,546 B2
(45) Date of Patent: Sep. 12, 2017

(54) IDENTIFYING REPEAT SUBSEQUENCES BY LEFT AND RIGHT CONTEXTS

(71) Applicant: Xerox Corporation, Norwalk, CT (US)

(72) Inventor: Matthias Galle, St-Martin d'Heres (FR)

(73) Assignee: XEROX CORPORATION, Norwalk, CT (US)

(*) Notice: Subject to any disclaimer, the term of this patent is extended or adjusted under 35 U.S.C. 154(b) by 808 days.

(21) Appl. No.: 13/901,736

(22) Filed: May 24, 2013

(65) Prior Publication Data

US 2014/0350917 A1 Nov. 27, 2014

(51) Int. Cl.
  *G06F 17/27* (2006.01)
  *G06F 17/22* (2006.01)

(52) U.S. Cl.
  CPC .......... *G06F 17/22* (2013.01); *G06F 17/276* (2013.01)

(58) Field of Classification Search
  CPC .............................. G06F 17/22; G06F 17/276
  USPC .............................................................. 704/9
  See application file for complete search history.

(56) References Cited

U.S. PATENT DOCUMENTS

| 5,903,861 | A * | 5/1999 | Chan ................ G06F 3/018 704/9 |
| 7,679,504 | B2 * | 3/2010 | Wang .................. A61B 5/0205 340/506 |
| 2004/0153255 | A1 * | 8/2004 | Ahn ..................... H03M 7/30 702/20 |
| 2004/0153307 | A1 * | 8/2004 | Tishby ................ G06F 17/2775 704/4 |
| 2004/0243387 | A1 * | 12/2004 | De Brabander .......... G06F 8/34 704/1 |
| 2005/0053948 | A1 * | 3/2005 | Robinson ................ C12P 19/34 435/6.12 |
| 2006/0112264 | A1 * | 5/2006 | Agarwal .................. H03M 7/30 713/150 |
| 2007/0061356 | A1 * | 3/2007 | Zhang ................ G06F 17/30719 |
| 2007/0239745 | A1 | 10/2007 | Guerraz et al. |

(Continued)

FOREIGN PATENT DOCUMENTS

GB  WO 2005068089 A2 * 7/2005 ............. G06F 19/22

OTHER PUBLICATIONS

Ahonen-Myka, "Discovery of Frequent Word Sequences in Text." Pattern Detection and Discovery. Springer Berlin Heidelberg, 2002. pp. 180-189.*

(Continued)

*Primary Examiner* — Lamont Spooner
*Assistant Examiner* — Oluwadamilola M Ogunbiyi
(74) *Attorney, Agent, or Firm* — Fay Sharpe LLP

(57) ABSTRACT

A system and method of identifying repeat subsequences having at least a value of x for threshold of different left contexts and a value of y for a threshold of different right contexts for an input sequence are disclosed. The method may include generating a lexicographically sorted suffix array for the input sequence and a longest common prefix array. The suffix array is traversed in lexicographic order comparing the longest common prefix values between consecutive suffixes. Suffixes with the same longest common prefix are representative of occurrence of the same repeat, a higher longest common prefix indicates a new occurrence of a longer repeat, and a lower longest common prefix indicates the last occurrence of a repeat.

23 Claims, 6 Drawing Sheets

(56) References Cited

U.S. PATENT DOCUMENTS

| | | | |
|---|---|---|---|
| 2009/0024555 A1* | 1/2009 | Rieck | G06F 7/02 706/54 |
| 2010/0306260 A1* | 12/2010 | Dejean | G06F 17/2745 707/776 |
| 2011/0407011 | 2/2011 | Perronnin et al. | |
| 2011/0103682 A1 | 5/2011 | Chidlovskii et al. | |
| 2012/0150531 A1* | 6/2012 | Bangalore | G06F 17/28 704/9 |
| 2012/0306670 A1* | 12/2012 | Mickle | H03M 7/3084 341/79 |

OTHER PUBLICATIONS

Macherey et al, "Language-independent Compound Splitting with Morphological Operations," Proceedings of the 49th Annual Meeting of the Association for Computational Linguistics: Human Language Technologies, vol. 1 pp. 1395-1404.*
Gusfield D., "Algortihms on String, Trees, and Sequences: Computer Science and Computational Biology", Cambridge University Press, Jan. 1997, pp. 143-155.*
U.S. Appl. No. 13/765,066, filed Feb. 12, 2013, Galle.
U.S. Appl. No. 13/437,079, filed Apr. 4, 2012, Galle, et al.
Solan, et al. "Unsupervised learning of natural languages" Proc. Nat'l Academy of Sciences, vol. 102, No. 33, 2005, pp. 11629-11634.
Van Zaanen, M. "ABL: Alignment-based learning", Int'l Conf. on Computational Linguistics, 2000, pp. 961-967.
Clark, A. "Learning deterministic context free grammars; The Omphalos Competition", Machine Learning, 2007, pp. 93-100.
Clark, et al. "A polynomial algorithm for the inference of context free languages" $9^{th}$ Intl. Colloquium on Grammatical Inference: Algorithms and Applications (ICGI), 2008, pp. 29-42.
Ko, et al. "Space Efficient linear time construction of suffix arrays" *Combinatorial Pattern Matching*, 2003, pp. 200-210.
Kim, et al. "Linear-time construction of suffix arrays (Extended Abstract)" CPM 2003, LNCS 2676, 2003, pp. 186-199.
Abouelhoda, et al. "Replacing suffix trees with enhanced suffix arrays" Journal of Discrete Algorithms, Feb. 2004, 2:53-86.
Karkkainen, et al. "Simple linear work suffix array construction" ICALP 2003, LNCS 2719, 2003, pp. 943-955.
Larsson, et al. "Faster suffix sorting", Dept. of Computer Science, Lund University, 1999, pp. 1-20.
Manzini, et al. "Engineering a lightweight suffix array construction algorithm (Extended Abstract)", ESA 2002, LNCS 2461, 2002, pp. 698-710.
Puglisi, et al. "Fast optimal algorithms for computing all the repeats in a string", Proc. of the Prague Stringology Conf. 2008, pp. 161-169.
Puglisi, et al. "A taxonomy of suffix array construction algorithms", ACM Computing Surveys, vol. 39, No. 2, 2008, pp. 1-35.
Adriaans, et al. "The EMILE 4.1 Grammar induction toolbox" International Colloquium on Grammatical Inference, Jan. 2002, pp. 293-295.
Gusfield, D. "Algorithms on Strings, Trees, and Sequences: Computer Science and Computational Biology" Cambridge University Press, Jan. 1997, pp. 143-147.
Galle, M. Searching for Compact Hierarchical Structures in DNA by means of the Smallest Grammar Problem. Ph.D. Thesis, Universite de Rennes 1, Feb. 2011, pp. 1-161.

* cited by examiner

SUFFIX ARRAY AND LCP FOR "BANANAS$"

| i | SUFFIX AT POSITION i | LEX. SORT | SA | S[SA[i]] | LCP[i] |
|---|---|---|---|---|---|
| 1 | BANANAS§ | 5 | 8 | § | 0 (BY DEFINITION) |
| 2 | ANANAS§ | 2 | 2 | ANANAS§ | 0 |
| 3 | NANAS§ | 6 | 4 | ANAS§ | 3 |
| 4 | ANAS§ | 3 | 6 | AS§ | 1 |
| 5 | NAS§ | 7 | 1 | BANANAS§ | 0 |
| 6 | AS§ | 4 | 3 | NANAS§ | 0 |
| 7 | S§ | 8 | 5 | NAS§ | 2 |
| 8 | § | 1 | 7 | S§ | 0 |

FIG. 2

IDENTIFYING REPEAT SUBSEQUENCES BY LEFT AND RIGHT CONTEXTS

BACKGROUND

The exemplary embodiment relates to systems and methods for identifying repeat subsequences in a sequence of symbols where the repeat subsequences satisfy a threshold context diversity, and finds application in representing a textual document using identified repeat subsequences for interpretation of documents, such as classifying the textual document, and comparing or clustering of documents.

Inferring constituents, such as a set of repeated words or sequences of words, is a basic step for many applications involving textual documents. These are the semantic blocks that define the meaning of a document. They can be used to represent the document, and an accurate description of a document is beneficial to tasks such as classification, clustering, topic detection, and knowledge extraction. They are also useful in inferring the structure of a document. In grammatical inference, where it is assumed that the document samples are generated by a grammar, it is useful to determine which sequences of the document correspond to the same grammatical constituent before detecting how different rules are related to each other.

The standard approach for extracting features and creating representations for textual documents is called the "bag-of-words," where each dimension in a vector space model represents one word. To consider longer sequences, higher level language model such as n-grams, may be used. However, such methods do not consider the context in which the sequence appears. Context, as used herein, refers to the constituents immediately to the left and right of a given constituent. In the case of a sequence of words, for example, the left context includes the word (or a sequence of words) that is positioned immediately to the left of an occurrence of the sequence and the right context includes the word (or a sequence of words) that is positioned immediately to the right of the occurrence of the sequence.

Algorithms have been developed which have some notion of context. As an example, Solan, et al., describes a system referred to as ADIOS which uses the fraction of different contexts in which a substring appears as a feature to decide on a set of constituents. (See, Zach Solan, et al., "Unsupervised learning of natural languages," Proc. Nat'l Academy of Sciences, vol. 102, no. 33, pp. 11629-11634 (2005). Another approach is Zellig Harris substitutability theory, which is related to the idea of context of a constituent. An implementation of this theory is described in Menno van Zaanen, "ABL: Alignment-based learning," Intern'l Conf. on Computational Linguistics (COLING), pp. 961-967 (2000). Another approach uses a mutual information criterion (see, Alexander Clark, "Learning deterministic context free grammars: The Omphalos competition," Machine Learning, pp. 93-110 (2007); and Clark, et al., "A polynomial algorithm for the inference of context free languages," 9th International Colloquium on Grammatical Inference: Algorithms and Applications (ICGI), pp. 29-42 (2008)). Such methods, however, rely on computationally expensive algorithms to detect constituents.

There remains a need for a system and method for detection of representative constituents of text documents which allows context of repeat subsequences to be considered in a computationally efficient manner.

INCORPORATION BY REFERENCE

The following references, the disclosures of which are incorporated herein in their entireties, by reference, are mentioned:

U.S. application Ser. No. 13/765,066, filed on Feb. 12, 2013, entitled BAG-OF-REPEATS REPRESENTATION OF DOCUMENTS, by Matthias Gallé describes a system and method for representing a document based on repeat subsequences.

The following relate to training a classifier and classification: U.S. Pub. No. 201100407011, entitled TRAINING A CLASSIFIER BY DIMENSION-WISE EMBEDDING OF TRAINING DATA, by Perronnin, et al.; and U.S. Pub. No. 20110103682, entitled MULTI-MODALITY CLASSIFICATION FOR ONE-CLASS CLASSIFICATION IN SOCIAL NETWORKS, by Chidlovskii, et al.

The following relates to a bag-of-words format: U.S. Pub. No. 20070239745, entitled HIERARCHICAL CLUSTERING WITH REAL-TIME UPDATING, by Guerraz, et al.

BRIEF DESCRIPTION

In accordance with one aspect of the exemplary embodiment, a method of identifying repeat subsequences of symbols in a sequence of symbols includes receiving a sequence of symbols. Values of x and y are defined, where x corresponds to a threshold number of different left contexts for a given repeat subsequence in the sequence and y corresponds to a threshold number of different right contexts for a given repeat subsequence in the sequence to be identified as context diverse. A lexicographically sorted array of suffixes in the sequence is generated. A longest common prefix array is computed, each value in the longest common prefix array representing a length, in symbols, of a longest common prefix that occurs in each of an adjacent pair of suffixes in the lexicographically sorted array. The method further includes sequentially comparing pairs of first and second sequential longest common prefix values and, based on the comparison, identifying at least one of an occurrence of a same repeat subsequence, when the compared first and second longest common prefix values are the same, a new occurrence of a longer repeat subsequence when the second of the compared longest common prefix values is higher, and a last occurrence of a given repeat subsequence when the second of the compared longest common prefix values is lower. Based on the sequential comparisons, context diverse repeat subsequences are identified in the sequence, each of the identified context diverse repeat subsequences having at least the defined threshold number of different left and right contexts. At least one of the generating, computing, comparing, and identifying may be performed by a computer processor.

In accordance with another aspect, a system for detecting repeat subsequences in a sequence includes a suffix array generator which generates a lexicographically sorted suffix array from an input sequence of symbols. A longest common prefix array generator generates a longest common prefix array based on the lexicographically sorted suffix array. A repeat detector receives the input sequence of symbols, the sorted suffix array, the longest common prefix array, a value x, and a value y. x corresponds to a threshold number of different left contexts for a given repeat subsequence in the sequence and y corresponds to a threshold number of different right contexts for a given repeat subsequence in the sequence. The repeat detector identifies repeat subsequences in the sequence based on the longest common prefix array, constructs a left context set for each repeat subsequence based on the longest common prefix array, counts a number of right contexts for each repeat subsequence, and identifies context diverse repeat subsequences comprising repeat subsequences having a cardinality of the left context set which is at least x and a count which is at least y. A processor implements the suffix array generator, the longest common prefix array generator, and the repeat detector.

In accordance with another aspect, a method for representing a document includes receiving a collection of documents, generating a sequence of symbols in an alphabet based on text of the documents, and providing for independently defining values of x and y, where x corresponds to a threshold number of different left contexts for a given repeat subsequence in the sequence and y corresponds to a threshold number of different right contexts for a given repeat subsequence in the sequence. The method includes processing the sequence to identify repeat subsequences, each including at least one symbol, and incrementally identifying those of the repeat subsequences in the sequence which have left and right contexts of at least x and y, respectively as a class of context diverse repeat subsequences. For a document in the collection, the method includes representing the document based on occurrences of repeat subsequences in the document that are in the class of context diverse repeat subsequences. At least one of the processing, identifying, and representing the document may be performed by a computer processor.

BRIEF DESCRIPTION OF THE DRAWINGS

FIG. 2 is a table illustrating the suffixes, suffix array, and longest common prefix (LCP) array of an example word "bananas";

DETAILED DESCRIPTION

Figure 1:
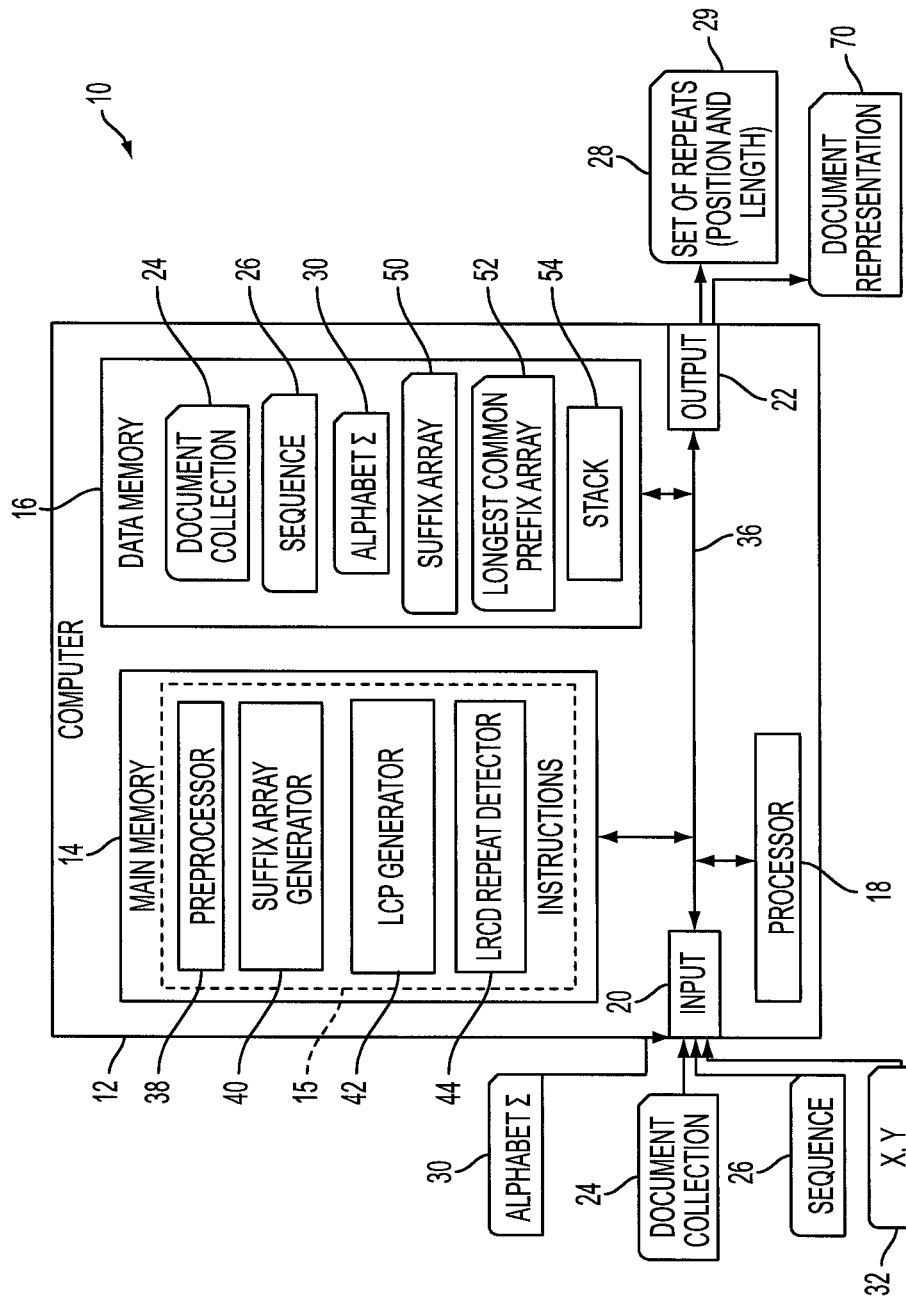
FIG. 1 is a functional block diagram of a system for calculating repeats having a left context of x and a right context of y ($\langle x, y \rangle$-LRCD repeats)

A class of repeat subsequences ("repeats"), referred to herein as left and right context diverse (LRCD) repeats, is defined by the number of different left and right contexts in which a given repeat appears in a sequence of symbols, or "string."

A "repeat" or "repeat subsequence," as used herein, is a subsequence of symbols, the subsequence comprising at least one symbol, and wherein at least two occurrences of the subsequence are present in a sequence of symbols. The exemplary symbols may be drawn from a finite alphabet, which may be a predefined alphabet or may be constructed from a sequence of symbols as the sequence is processed. Examples of symbols include words, single characters, and parts of speech (POS). In the exemplary embodiment, a repeat subsequence is one which occurs at least twice. However, it is also contemplated that a larger number of occurrences may be defined for a subsequence to be considered as a repeat subsequence, such as 3, 4, 5, or more.

In the case of words as symbols, the finite alphabet may consist of all words in the sequence or in a longer sequence which includes the sequence. As an example, the alphabet may include all words (or at least a subset of the words) found in a document or in a collection of documents. Alternatively, a separate dictionary may be provided as the alphabet. In the alphabet, words can be represented by their root (lemma) form. For example, the words present in a document may each be assigned a symbol corresponding to the lemma form of the word.

In the case of characters, the finite alphabet can include the set of letters A to Z or may include additional or different characters, such as the set of ASCII characters or a Unicode character set, or a selected subset of ASCII or Unicode characters, such as all characters found in the sequence (e.g., a document) or a longer sequence comprising the sequence (e.g., a collection of documents). The sequence of symbols may thus represent letters of a string. The alphabet may be known before the document is processed (predefined by, e.g., a character mapping or encoding) or constructed as the document is processed.

In the case of parts of speech, the finite alphabet can include parts of speech which can be assigned to one or more words of a text sequence, such as noun, verb, adjective, adverb, noun phrase, and the like. The number of different parts of speech which can be assigned is limited by the number which the parser is able to recognize and can be, for example, from 10-40. For example, the words present in a document may each be assigned a symbol corresponding to its likely part of speech (as assigned by part of speech tagging). Some tokens may be assigned more than one part of speech, and may later be disambiguated, based on contextual information. The tokens may be tagged with the identified parts of speech.

Multiple documents may be combined (by, e.g., concatenation) to form a sequence which is then processed. In the case of words and POS as symbols, the documents considered are textual documents in a natural language, such as English or French, having a grammar. The words represented in the sequence are thus words which are primarily found in a dictionary of one or more languages, or which are proper nouns or named entities which obey the grammar of the language. If multiple documents are combined, a repeat need not be limited to a single document and in general at least some of the repeats have subsequence occurrences in more than one of the documents. Repeats may partially overlap each other. For example if the sequence in the document is represented by the symbols ABCCCCC, then overlapping repeats CCC and CCCC can be found, or in a sequence ACACAC, overlapping repeats of ACA and ACAC can be found.

Each symbol in a considered sequence is considered to have a left context and a right context. The left context for a given occurrence of a repeat subsequence includes (or is) a symbol which immediately precedes the occurrence of the repeat subsequence in the considered sequence. The right context for a given occurrence of a repeat subsequence includes (or is) a symbol which immediately follows the repeat subsequence in the sequence. For example in the sequence of symbols ACABACAC, the first occurrence of the repeat ACA has a left context which can be defined by a unique symbol, denoted §, that is not found in the document collection (since there is no actual left context in this case) and a right context which is/includes the symbol B. The second occurrence of the repeat ACA has a left context which is/includes the symbol B and a right context which is the symbol C. In one embodiment, left and right contexts are both exactly one symbol in length.

The terms left and right refer to the respective positions in the sequence in the reading order of the sequence (or vice versa). For sequences arranged vertically rather than horizontally, left and right contexts can be considered as top and bottom contexts (or vice versa).

Aspects of the exemplary embodiment relate to identifying repeats having left and right contexts of a given cardinality (number of different contexts) in a sequence of symbols. A repeat having a cardinality of at least x for its left context and at least y for its right context is called an $\langle x, y \rangle$-LRCD repeat, where x and y are both integers which can be the same or different.

The following notation will be used:

A sequence s is a concatenation of atomic symbols $s[1] \ldots s[n]$ is which each symbol is a member of an alphabet $\Sigma$ (that is: $s[i] \in \Sigma$). The length of s, denoted $|s|$, is the number of symbols, generally denoted by n. A subsequence of symbols $\omega$ is said to occur in s at position m if $\omega[i]=s[m+i]$ for $i=1 \ldots |\omega|$. The set of occurrences of subsequence $\omega$ in s is denoted by $occ_s(\omega)$ (or just $occ(\omega)$ if s is clear from the context). If $occ_s(\omega) \geq 2$, $\omega$ is called a repeat in s.

The size (cardinality) $lc_s(\omega)$ of the left context (right context $rc_s(\omega)$) of a subsequence $\omega$ in s is defined as the number of different symbols appearing immediately to the left (right) of all occurrences of $\omega$:

$$lc_s(\omega)=|\{s[i-1]:i \in occ(\omega)\}|$$

$$rc_s(\omega)=|\{s[i+|\omega|]:i \in occ(\omega)\}|$$

As an example, consider the characters in the word bananas as a sequence s of symbols. a is a repeat subsequence $\omega$ in bananas because it occurs at least twice. The left context of the subsequence a in the word bananas has a cardinality (or size) of 2. This is because two different characters appear to the left of the occurrences of a, which are b and n. The size of the right context of a is also 2, and the corresponding characters are n and s.

Repeats can be characterized by the size of their contexts. A maximal repeat is defined as a repeat $\omega$ which cannot be extended without losing support (number of occurrences). That is, there is no subsequence $a\omega$ or $\omega a$ that appears the same number of times as $\omega$. Equivalently, this means that the size of both its right and left contexts have to be greater than 1. In the above notation:

A repeat $\omega$ is a maximal repeat in s if and only if $lc_s(\omega)$, $rc_s(\omega) \geq 2$.

In the above bananas example, a is a maximal repeat (both contexts have a size of 2). As a counter example, n is a repeat but is not a maximal repeat since the right and left contexts of n are both 1 in size. This implies that it is possible to extend the subsequence without reducing the number of its occurrences. Specifically, the subsequences an, na, and ana all repeat twice (the same number of times as n) and are longer than n. Note that in this simplified example, both the left and right contexts are 1 in size, but the contexts need not both be 1. For example, in the word bandana, the left context of n is size 1 and the right context is size 2. The subsequence n can still be extended to a longer subsequence an while maintaining the same number of repeats.

A super-maximal repeat is defined herein as a repeat that is not a subsequence of any other repeat. It is characterized as having no right or left context repeated. Each repeat has a unique left and right context. In the above notation:

A repeat $\omega$ is super-maximal in s if and only if $lc_s(\omega)=rc_s(\omega)=|occ(\omega)|$.

In the sequence bananas, an example of a super-maximal repeat is ana, since it occurs twice (overlapping), having a left and right context sizes of 2 (left characters b and n, right characters n and s).

The exemplary LRCD repeat is defined by the size of its left and right contexts. A subsequence $\omega$ is x-left context diverse if its left context size is at least x. A subsequence $\omega$ is y-right context diverse if its right context size is at least y. x and y are predefined and can each be equal to or greater than 1 or equal to or greater than 2. More formally:

A subsequence $\omega$ is x-left-context-diverse (xlcd) in s if $lc(\omega) \geq x$.

A subsequence $\omega$ is y-right-context-diverse (yrcd) in s if $rc(\omega) \geq y$.

A subsequence $\omega$ is $\langle x,y \rangle$-LRCD in s if it is both xlcd and yrcd.

It may be noted from the above definitions that:

1. A word $\omega$ is a maximal repeat in s if and only if it is $\langle 2,2 \rangle$-context-diverse.
2. A word $\omega$ is a super-maximal repeat in s if and only if it is $\langle |occ(\omega)|, |occ(\omega)| \rangle$-context-diverse.

An advantage of the exemplary LRCD-repeats is that they are relatively sparse and simple to compute. From the linearity of right- and left-maximal repeats, it can be seen that the number of LRCD-repeats is $\mathcal{O}(n)$ if and only if $\max(x, y) \geq 2$. It is $\mathcal{O}(n^2)$ otherwise.

The class of LRCD repeats provides a range of repeats between the extremes of super-maximal and maximal.

One class of repeats that cannot be captured by LRCD-repeats is largest-maximal repeats. These repeats require at least one occurrence with a right (or left) context that is different from all right (or left) contexts of remaining occurrences. Such context-uniqueness is not captured with the rc and lc functions.

While particular reference has been made herein to letters as symbols, it is to be appreciated that words may be considered as the symbols of the sequence S. In some embodiments, the sequences or documents may be stripped of punctuation (or punctuation simply ignored). The input may also be other than words or documents. The input may be, for example, a gene sequence.

The set of $\langle x, y \rangle$-LRCD repeats which satisfy the preselected values of x and y can be identified in a document (or in a document collection of two or more documents) and can be used to characterize the document (or any one or more of the documents in the collection). Representing a document based on the occurrence of these and optionally other types of repeats can be used for a variety of purposes, such as document clustering, similarity computation, document retrieval, and the like.

A system and method for retrieving $\langle x, y \rangle$-LRCD repeats will now be described, which gives the bounds of the repeats based on their number with respect to the size of the sequence. The method supposes a constant alphabet size. The exemplary $\langle x, y \rangle$-LRCD repeats can be more accurate for detecting constituents than existing notions of words. The repeats may be identified as repeated subsequences within a sequence representing a collection of documents.

FIG. 1 illustrates an exemplary computer implemented system 10 for identifying $\langle x, y \rangle$-LRCD repeats. The system 10 includes a computer 12 with main memory 14 and data memory 16. The memory 14 stores instructions 15 for performing the exemplary method described in FIGS. 2 and 3. A digital processor 18, in addition to controlling operation of the computer 12, executes the instructions 15 stored in memory 14.

The computer 12 may include one or more dedicated or general purpose computing devices, such a server computer or a desktop or laptop computer with an associated display device and a user input device, such as a keyboard and/or cursor control device (not shown), or any suitable computing device capable of implementing the method. The memories 14, 16 may be separate or combined and may represent any type of computer readable memory such as random access memory (RAM), read only memory (ROM), magnetic disk or tape, optical flash, flash memory, or holographic memory. In one embodiment, the memory 14, 16 comprises a combination of random access memory and read only memory. The digital processor 18 can be variously embodied, such as by a single-core processor, a dual-core processor (or more generally by a multiple-core-processor), a digital processor and cooperating math coprocessor, a digital controller, and the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in the storage medium such as RAM, a hard disk, optical disk, or so forth, as is also intend to encompass so-called "firmware" that is software stored on a ROM or so forth. Such software may be organized in various ways, and may include software components organized as libraries, Internet-based programs stored on a remote server or so forth, source code, interpretive code, directly executable code, and so forth. It is contemplated that the software may invoke system-level code or calls to other software residing on a server or other location to perform certain functions.

The illustrated computer 12 includes an input module 20 that may receive a collection of sequences 26 of symbols. The sequences 26 may be generated from a collection 24 of text documents, such as newspaper articles, OCRed forms, or the like. The sequences 26, e.g., one sequence per document, may be extracted externally or by the system and may be concatenated to form a single sequence for the collection. The symbols, in this case, can be words (optionally lemmatized), characters, or POS. Output interface 22 outputs information 28, based on the application of instructions 15. The information output may include a set 29 of repeats generated by the system. In the exemplary embodiment, the set 29 of repeats consists of or includes $\langle x, y \rangle$-LRCD repeats. Other information 28 which is output may be based on the identified repeats. For example, a label may be output for a given document that is applied by a trained classifier based on the identified repeats in the document. In other embodiments, a cluster of documents is output or a set of documents similar to a selected document, or the like.

The input documents 24 or sequences 26 may be accompanied by an alphabet 30, or this may be constructed as the documents in the collection 24 are processed or predefined and stored in memory 16. Provision may also be made for a user to input information 32 indicating selected values of x and y which specify the threshold number of different left and right contexts that an $\langle x, y \rangle$-LRCD repeat must have to be included in the set 29. The user may be limited to a predefined range, such as selecting from 1-20 or from 1-10 for each of x and y. In some embodiments, at least one or both of x and y may be required to be at least 2. In some embodiments, at least one or both of x and y is at least 3 or at least 5. In some embodiments, y>x. In some embodiments, y is at least 2x. In some embodiments, x+y>5. Suitable values of x and y may also depend on the likelihood that repeats will be found. In one embodiment, suitable values of x and y are predetermined from training data, for example, values which tend to provide $\langle x, y \rangle$-LRCD representations of documents that are useful for a particular processing task. The system returns repeat subsequences that satisfy the threshold of left and right context diversity x and y, i.e. which can have the same number or a greater number of different contexts than the specified values. In the exemplary embodiment, no maximum is set on the number of different left and/or right contexts that a given $\langle x, y \rangle$-LRCD can be found in, although this is not excluded.

Exemplary input and output interfaces 20, 22 include wired and wireless network interfaces, such as modems, or local interfaces, such as USB ports, disk drives, and the like. Components 12, 14, 16, 20, and 22 of the computer are communicatively interconnected by a data/control bus 36.

In one embodiment, the computer 12 is configured by suitable programming software 15 and/or firmware to embody a preprocessor component 38, a suffix array generator 40, a longest common prefix (LCP) generator 42, and an LRCD repeat detector 44. Optionally, the preprocessing component may combine (by e.g., concatenation) sequences from documents in the collection 24 to create the larger sequence 26.

The preprocessor 38 parses the input collection of documents 26 by employing a grammar or other processing technique. For example, the preprocessor 38 may reduce all the words in the collection of documents to a normalized form, such as a lemmatized, lowercase form. Plural nouns are replaced by the singular form and verbs by the infinitive form. Punctuation may be stripped from the sequence. Words may also be processed to identify their part of speech, by part-of-speech (POS) tagging. If an alphabet is not input or the same as used natively by system 10, the preprocessor 38 may, before or after pre-processing, generate an alphabet 30 which includes all the symbols found within the collection of documents 26.

Data memory 16 stores the input document collection 24, sequence 26, and alphabet 30. Data memory also stores a suffix array 50 and longest common prefix (LCP) array 52 after they are created by the suffix array generator 40 and LCP generator 42, respectively. Data memory also stores a stack 54 used by the LRCD repeat detector 44 to generate the set of repeats 28. A stack is a Last-In-First-Out (LIFO) data structure storing elements which can be added to the stack by a "push" operation and retrieved from the stack by a "pop" operation. The stack may also support a "top" operation (sometimes called "peak") to access the topmost element without removing it from the stack. Data memory also stores various local variables used by the separate modules which are omitted for clarity.

One way of computing all $\langle x, y \rangle$-LRCD repeats is a two stage approach: first, all repeats $occ_s(\omega)$ are computed. Then, for each $\omega$ all occurrences are inspected and two sets of symbols stored: those occurring to the left and to the right. More formally, the left and right symbols are:

$$\{s[i-1]\} \text{ and } \{s[i+|\omega|]\}, \forall i \in occ_s(\omega))$$

The $\langle x, y \rangle$-LRCD repeats are then those where these left and right sets have a size of at least x and y, respectively. However, such an approach is computationally expensive ($\mathcal{O}(n^2)$) as there may be $n^2$ number of simple repeats in s.

In the case where $\langle x, y \rangle$-LRCD repeats are sought such that max(x, y)≥2, a different approach can be employed. In his approach, one of the left and right maximal repeats can be precomputed, as the maximal number of repeats is linear if max(x, y)≥2. However, the total number of occurrences of such repeats may still be $\mathcal{O}(n^2)$.

In the exemplary method, the $\langle x, y \rangle$-LRCD repeats of a sequence are computed in linear time, supposing that the alphabet is constant. The method computes the right context using two arrays: a suffix array 50 and a longest common prefix (LCP) array 52. A suffix array is part of the suffix-tree data structure family. It is composed of a lexicographically ordered array of all suffixes of the input sequence. To save memory, the suffixes themselves need not be stored. Instead, the starting position of each suffix is stored.

A "suffix," as used herein, is a contiguous subsequence of one or more symbols in the sequence which terminate at the end of the sequence and which can include from 0 to all symbols in the sequence. A "prefix," as used herein, is a contiguous subsequence of one or more symbols of the respective suffix, beginning with the first symbol in the suffix. In the exemplary embodiment a special symbol § is used at the end of the sequence to ease computation. The longest suffix is the length of the entire sequence (plus the termination character). The separator character § may also be used to separate concatenated documents. The separator character may be another instance of a context if a repeat occurs at the beginning or end of a sequence.

The suffix array 50 is of size n+1 (the length of the sequence plus 1 for the termination symbol §). It is sorted lexicographically, such that all occurrences of the same repeat are consecutive in the suffix array. This allows the right context to be computed by counting the consecutive occurrences of an identical repeat. The lexicographical sorting order assumes that the symbols in the alphabet 30 have a predefined sorting order, such that the sequences of symbols forming the suffixes can be sorted based on that order. In the case of characters as symbols, the order from A to Z can be followed, optionally with other characters, such as numbers, following in a predefined order. In the case of words as symbols, the lexicographical sorting order may correspond to the order found in a dictionary, such that the first character is considered first, then the second, and so on, e.g., the symbol act appears in lexicographical order before ape. In the case of parts of speech, any predefined order can be selected as the lexicographical order, such as Noun, Verb, Adjective . . . , and so forth. As will be appreciated, in the exemplary embodiment, the array can be stored as a one dimensional vector, i.e., one value for each element of a vector.

More formally, an order $\prec$ is defined over the alphabet $\Sigma$. The lexicographical extension $\Sigma^*$ to $\Sigma$ will also be denoted by $\prec$. For the sequence s of length n, let $\tilde{s}=s\S$, with the special character § not contained in $\Sigma$ being ordered earlier than every element of $\Sigma$ by $\prec$. The suffix array of $\tilde{s}$ is the lexicographically ordered (sorted) array of each suffix of $\tilde{s}$.

The suffix array, denoted by sa, is a permutation of [1·n+1] such that:

$$\forall i, 1 < i \leq n+1 : \tilde{s}[sa[i-1]\ldots] \prec \tilde{s}[sa[i]\ldots]$$

where s[i . . . ] denotes the suffix of s starting at position i (s[i] . . . s[n]).

This allows the index position i of the suffix in the sequence to be the value of the element in the suffix array when the elements of the array are lexicographically ordered. An example for the sequence bananas is shown in FIG. 2, explained below. For this example, the suffix array 50 can be represented by the vector (8,2,4,6,1,3,5,7).

In the exemplary embodiment, the suffix array 50 is used in combination with the longest common prefix (LCP) array 52. The LCP array gives the length of the longest common prefix between two suffixes whose starting positions are adjacent in sa, meaning the suffixes are lexicographically consecutive. For the first element, there is no preceding element, so lcp[1] is defined as 0. For other pairs of adjacent suffixes in the suffix array, the length of the longest common prefix can be determined by comparing two adjacent suffixes in the SA 50, symbol by symbol, beginning with the first one of each, until the two symbols being compared do not match. The length of the matching symbols is the value of the LCP array for the second of the pair of prefixes. Formally:

lcp[1]=0, $\forall i \in [2, n+1]: \text{lcp}[i] = m$ such that:

$\tilde{s}[sa[i-1]\ldots][\ldots m-1] = \tilde{s}[sa[i]\ldots][\ldots m-1]$ and $\tilde{s}[sa[i-1]\ldots][m] \neq \tilde{s}[sa[i]\ldots][m]$.

In the exemplary embodiment, the method takes symbols in sequence off a stack and identifies repeats progressively. While the suffix array 50 allows computing the right context by counting consecutive appearances of a repeat as they appear, calculating the left context entails an additional $|\Sigma|$ factor because, for each right maximal repeat, the symbols seen so far are stored to construct the left context. The maximal size of the number of symbols that must be stored to build the left context is the size of the alphabet $\Sigma$ 30. For constant size alphabets, this factor is still linear.

FIG. 2 illustrates creation of a suffix array (sa) 50 and LCP array (lcp(i)) 52 for the "bananas" example where the symbols are characters (using the special termination character "§"). Column 60 contains i, the index position in the respective array, for each suffix in the sequence bananas. Column 62 shows the suffix which starts at position i in the sequence. Column 64 shows the lexicographical sorting order of the suffixes. For example, the suffix starting at index position 4 is "anas§". After lexicographically sorting all of the suffixes, it is positioned as the 6th element in the lexical sorting order 64. Column 68 illustrates the corresponding subsequence. The lexicographically sorted 6th element may be found in the original sequence at the value contained in the 6th location in sa, which has an index position of 3, i.e., s[sa[6]]="nanas§".

Column 52 shows the LCP. The third row has a value of "3" because the first 3 letters ("ana") are the same between rows 2 and 3. Because there is no row preceding row 1, lcp[1] is defined as 0.

Suffix arrays can be constructed in linear time, but non-linear algorithms may be more efficient for practical applications.

The exemplary method takes advantage of the LCP array and the fact that all indexes of occurrences of the same repeat are consecutive in the suffix array (e.g., "ana" in rows 2 and 3 of FIG. 2). A corollary to this is that consecutive repeats having the same right context are also consecutive. That is, a repeat that is a subsequence of a longer repeat will appear in the suffix array either before or after the longer repeat (e.g., "a" in row 4 following "ana" in rows 2 and 3 of FIG. 2). The longer repeat corresponds to an occurrence of the shorter repeat having a repeated (same) right context. The SA and LCP do not provide full information about the left context. If the left context were repeated, however, that repeated left context will be processed elsewhere in the lexicographically sorted suffix array when the character to the left is encountered in lexicographic order (e.g., "no" processed in rows 6 and 7 after its substring "a" was processed in rows 2-4).

From the foregoing, it is evident that, after lexicographical sorting, a shorter repeat may be followed by a longer repeat, which may in turn be followed again by another occurrence of the shorter repeat. A stack 54 is used to keep track of the repeats. In the exemplary method, described in connection with FIGS. 3 and 4 and Algorithm 1, below, each element of the stack is a tuple which includes a starting position, length, count of different right contexts, and the set of left contexts. When a repeat is popped out, these are then inherited by the topmost (head) repeat in the stack. Keeping track of existing left contexts (as opposed to just a count as for the right) causes the |Σ| factor in the method's complexity. Sets may be implemented using an underlying data structure which adds an additional log(|Σ|) but which allows scaling to larger alphabets. This can be avoided by trading off additional memory by using a bit array.

Figure 3:
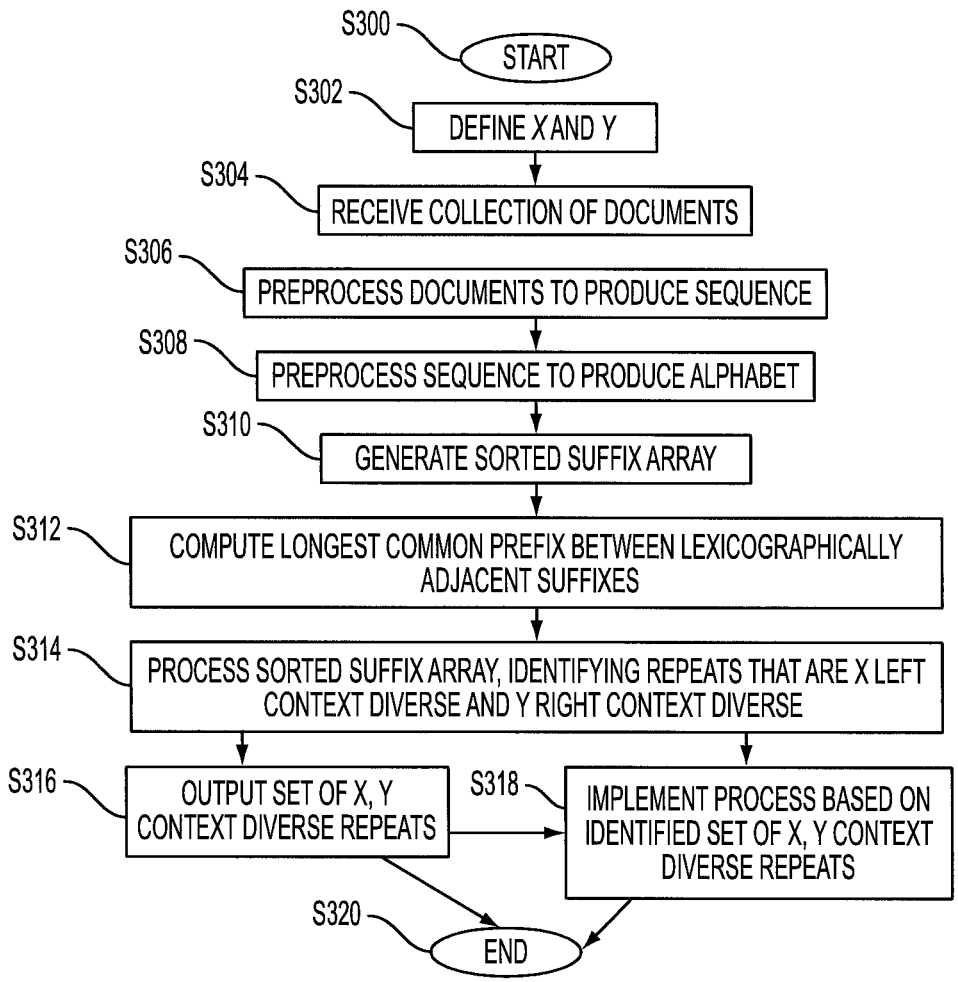
FIGS. 3 and 4 are flow charts illustrating a method for identifying $\langle x, y \rangle$-LRCD repeats.
Figure 4:
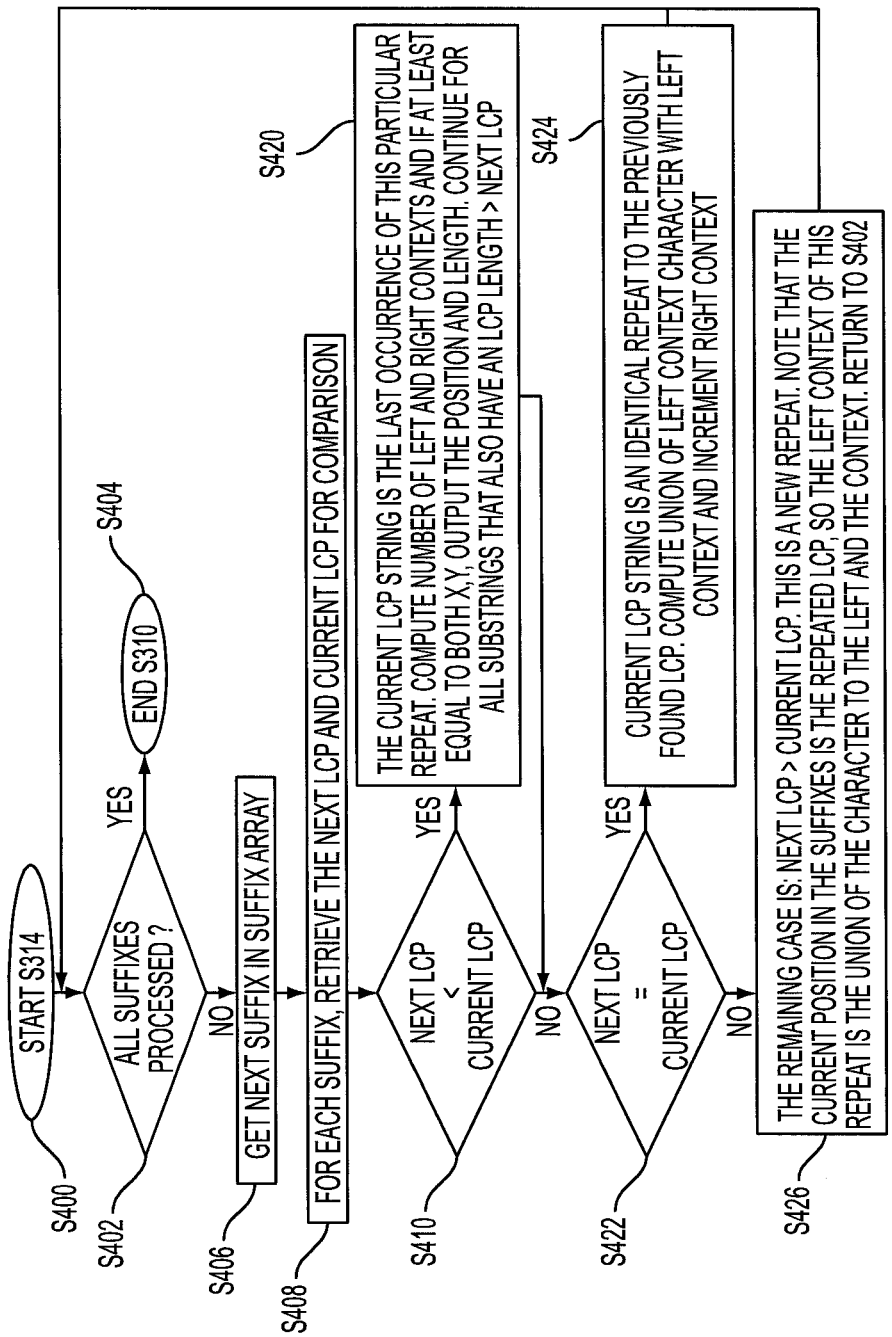

In some embodiments, the stack data structure may be replaced by a linked list or queue. In the method of FIGS. 3 and 4, the head of the stack is referred to as the "current" entry. For example, the "current" lcp is the value stored in lcp of the tuple at the head of the stack. The "next" lcp is the lcp at the value i. The variable st, initially set to i−1, is used to track the "current" suffix location. The current lcp and current suffix are off by 1 because lcp is a comparison between two suffixes. So, in line 6, the variable st is used to get the left context of the string, but in line 7, the lcp comparison uses the variable i. When a new occurrence is "pushed" at line 21, the variable st tracks the location.

In Algorithm 1 below, the following definitions apply:

The variable p holds the location in the string where the repeat is located. As discussed above, st is pushed in line 21, and p receives that pushed value in the "pop" at line 8.

The variable l is the length of the repeat. See, for example, line 16 where the length to the repeat is compared to the current (at location i in the array) lcp.

The variable lc holds the set of left contexts for a given repeat.

The variable stlc holds the set of left contexts for the suffix at st.

The variable T is a stack of tuples of <p, l, r, lc>. It provides push, pop, and top operations. T.top( ).<member> retrieves the member of the tuple at the top of the stack (e.g., T.top( ).r or T.top( ).lc).

The symbol ∧ indicates an "and" operation which requires that both conditions to the left and right must be true.

The symbol ∪ indicates a "union" operation, in which the sets to the left and right are combined and a set is returned with only one occurrence for duplicates. Elements (e.g., a single character) are treated as singleton sets.

The symbol = tests for the equivalence of the objects on the left and right sides. The assignment operator := assigns the value on the right to the variable on the left.

Algorithm 1 Computation of ⟨x, y⟩-LRCD repeats (xycd)
xycd (s, sa, lcp, x, y)

```
Input: sequence s, suffix array sa, lcp-array, minimal value of left (x)
and right (y) context diversity
Output: xycd-repeats in the form⟨p,l⟩
1:  T = empty stack
2:  ⟨p,l, r, lc⟩ := ⟨0,0,1,§⟩
3:  T.push(⟨p,l, r, lc⟩) {ensures that the stack never becomes empty}
4:  for all i ∈ [2..n + 1] do
5:    st := i − 1
6:    stlc := {s[sa[st] − 1]}
7:    while T.top( ).l > lcp[i] do {last occurrence of a repeat}
8:      ⟨p,l, r, lc⟩ := T.pop( )
9:      st := p
10:     stlc := lc
11:     if r ≥ y ∧ |lc|≥x then
12:       output⟨p,l⟩ {has i − p occurrences}
13:     end if
14:     T.top( ).lc := T.top( ).lc ∪ lc
```

Algorithm 1 Computation of ⟨x, y⟩-LRCD repeats (xycd)
xycd (s, sa, lcp, x, y)

```
15:     end while
16:     if T.top( ).l = lcp[i] then {new occurrence of same repeat}
17:       T.top( ).r := T.top( ).r + 1
18:       T.top( ).lc := T.top( ).lc ∪ {s[sa[i] − 1]}
19:     else {new repeat, which already has i − st occurrences}
20:       stlc := stlc ∪ {s[sa[i] − 1]}
21:       T.push(⟨st, lcp[i], 2, stlc⟩)
22:     end if
23: end for
```

As shown in the exemplary Algorithm 1, the exemplary method operates by processing the sorted suffix array 50 and LCP array 52 by analyzing the change in value of the LCP array. If it remains equal, this indicates another occurrence of the same repeat as the previous entry in the suffix array with a different right context. An increase in the LCP value indicates not only the presence of another repeat, but also that the current top of the stack is not adding an additional right-context until the newly found repeat is popped out of the stack. Finally, a decrease in the LCP value indicates the last occurrence of a repeat, and triggers the eventual output of the repeat being currently analyzed. As previously noted, the symbols appearing as left context are stored, allowing the left context to be computed when the last occurrence of the repeat is encountered (when LCP decreases). To illustrate this with the example of FIG. 2, in column 52, row 4 contains the value "1" which is less than row 3 containing "3", indicating the "anas§" of row 3 was the last occurrence of the repeat "ana". The repeat "ana" would be processed, and the repeat "a" would inherit its left context. The right context would be incremented by 1 to account for the repeats of "ana" which were also repeats of "a" having one identical right context ("n").

Exemplary pseudocode for implementing the method is depicted below in Algorithm 1, which takes as input the LCP array 52 and Suffix Array SA 50, as well as x, y, and the input sequence s. In line 21, a new repeat is added to the stack, and the position of this repeat (variable st) is stored on the stack within the pushed tuple, as well as the set of left context symbols seen so far (variable stlc). Because lcp compares the current entry to the previous entry, the repeat added here has two different right contexts. Note that there may have been several occurrences of a longer subsequence including the current repeat, but, as they are all "supersequence" repeats, they have the same right context with respect to this subsequence, so the right context is still "2", even if after multiple repeats of the supersequence (see rows 2 and 3 of FIG. 2, which are repeats of the "a" in row 4 of FIG. 2 and have the same right context "n").

The contexts of suffixes having an LCP value of zero are added to the tuple pushed on line 3 of Algorithm 1. This tuple prevents the stack from becoming empty when LCP values of zero are encountered, effectively treating LCP values of zero as repeats of length zero. Alternatively, the method could test for LCP values of zero and then proceed to the next value of "1".

FIGS. 3 and 4 depict a computer implemented method which may be performed with the system of FIG. 1. The method, details of which are described in greater detail below, begins at S300 of FIG. 3.

At S302, a collection of documents is received by the system.

At S304, threshold values x and y for the minimum number of different left and right contexts of an LRCD repeat are identified. In one embodiment, provision is made, e.g., through a graphical user interface, for a user to select values of x and y. The user may be provided with a range of values of x and y from which to choose. Alternatively, at S202, suitable values of x and y for a particular task may be learned, e.g., on a set of training documents.

At S306, the collection of documents 24 is optionally processed by the preprocessor 38 to produce the sequence 26 which is to be input into the suffix array generator 40. This may include OCR processing the document, if not in text format, lemmatizing words and/or identifying parts of speech, and inserting a special character § to delineate the end of each document.

At S308, the sequence is optionally processed by the preprocessor 38 to produce an alphabet Σ 30. The alphabet may consist of all symbols occurring in the sequence. The special character is not a member of alphabet Σ 30. Alternatively, alphabet Σ 30 may be predefined.

At S310, the sorted suffix array 50 is computed by the suffix array generator 40, as described above.

At S312, the LCP array 52 is computed by the LCP generator 42, as described above.

At S314, the sequence 26, suffix array 50, and LCP array 52 are processed to produce a set of $\langle x, y \rangle$-LRCD repeats 29, by the LRCD repeat detector, as explained further below, with reference to FIG. 4. In particular, the method includes comparing pairs of first and second sequential longest common prefix values in sequence in the LCP array and based on the comparison for each pair identifying a) an occurrence of a same repeat subsequence, when the compared first and second longest common prefix values are the same; b) a new occurrence of a longer repeat subsequence when the second of the compared longest common prefix values is higher; or c) a last occurrence of a given repeat subsequence when the second of the compared longest common prefix values is lower.

At S316, based on the identified set of $\langle x, y \rangle$-LRCD repeats 29, the repeats in the identified set occurring in at least one document in the collection may be identified and output. Index positions of the identified $\langle x, y \rangle$-LRCD repeats are output.

At S318, a process may be implemented based on the identified $\langle x, y \rangle$-LRCD repeats 29 in one or more of the documents in the collection and information 28 based on the process may be output.

The method ends at S320.

FIG. 4 shows the substeps of step S314 of FIG. 3 in one example implementation. At S400, S314 of FIG. 3 begins.

At S402, the suffix array 50 is checked to see if any suffixes remain unprocessed. If all suffixes have been processed, processing continues to S404 which ends step S314, and the method continues on FIG. 3 at S316 and/or S318.

If unprocessed suffixes remain, then, at S406, the next suffix is retrieved from the suffix array 50. The suffixes are stored in lexicographical order and are retrieved in lexicographical order. With reference to Algorithm 1, the counter that keeps track of the current suffix is "i", which is processed sequentially from 2 to n (see line 4).

At S408, the next LCP and current LCP are retrieved.

At S410, the next LCP is compared with the current LCP and, if the next LCP is less in value than the current LCP, processing continues at S420. This corresponds to the "else" statement of Algorithm 1, line 19. Note that in lines 7 and 16, top( ).1 is compared with lcp[i] to see if top( ).1 is greater than (line 7) or equal to (line 16) lcp[i]. The only remaining possibility is that top( ).1 is less than lcp[i], which is contained in the "else" clause. Note that, as 1 runs from 2 . . . n, lcp[i] is the "next" lcp. Looking at line 6, the "current" location in the suffix array is retrieved using st, which is i−1 (see line 5). The method as illustrated in FIGS. 3 and 4 is simplified in an attempt to make the method more readable and understandable, and thus omits some details.

At S420, as the next LCP is less than the current LCP, the current suffix must be the last occurrence of a repeat. For an example of this, see row 4 of FIG. 2. From row 3 to 4, LCP decreases from 3 to 1, indicating that row 3 is the last occurrence of a repeat (repeat "ana"). The number of right contexts has been computed by counting the number of occurrences of the repeat. The left context is computed from a set of letters appearing before the occurrences of the repeat. See lines 8-13 in Algorithm 1. The variable r is the count of the right contexts and lc is the set of left contexts. If the left and right contexts are greater than x and y (respectively), the repeat (position of first occurrence and length) are output. This process is repeated for all substrings for which the LCP is greater than the next lcp (shown by the while loop at line 7). Note that all subsequences inherit the left context, as all substrings occur in their parent supersequences (see line 14 of Algorithm 1). Processing then continues at S422.

At S422, the next LCP is compared to the current LCP to see if they are equal. S422 can be arrived at either after processing at S420 or because the test at S410 was false. If the next LCP and the current LCP are equal, this indicates an identical occurrence of an already seen repeat. The character to the left is "unioned" with the left context (line 18, the new character is inserted into the step but is not inserted twice if it already exists) and the right context is incremented (line 17). Processing then continues at S402.

If the test at S422 is false, then the next LCP is greater than the current LCP (see, for example, row 7 of FIG. 2). This is true because the next LCP was tested and found to be less than or equal in steps S410 and S422 respectively. This indicates a new repeat. There are at least two instances of the right context, one for the current suffix and one for the next suffix (e.g., rows 2 and 3 corresponding to the LCP increase in row 3), so the right context count is set to 2 (in line 21, the third element of the pushed tuple is "2"). After the new tuple is pushed to reflect the new repeat, processing continues by testing for more suffixes at S402.

Once all the suffixes are processed, the method continues in FIG. 3, where the repeats are output and/or subject to further processing.

As will be appreciated, the term "suffix array" can be considered as equivalent to a prefix array in which the special character § is positioned at the beginning of the sequence, rather than the end and a longest common prefix (lcp) is equivalent to a longest common suffix (lcs) in this case. Alternatively, if the end of the sequence is considered as the beginning, the same result is achieved. The claims are intended to be understood as encompassing each of these embodiments.

Example Processing Operations (S318)

1. Generating a Vector Spaced Representation of a Document in the Collection

Each document $d_i$ in the collection of documents $d_1$, $d_2 \ldots d_N$ may be mapped into a vector $r_{di}$ of size K, where, $r_{di}(j)$ contains the number of times an $\langle x,y \rangle$-LRCD repeat $r_j$ appears in document $d_i$. The exemplary representation 70 thus formed uses the occurrence and/or position of the $\langle x, y \rangle$-LRCD repeats in that document, which have been identified for the collection as a whole as S316, as a basic feature in the generated vector space representation.

In one embodiment, the document representation includes a vectorial representation which is indexed by the ⟨x, y⟩-LRCD repeats identified in the set. For each index, a value for one of the repeats that are in the class of ⟨x, y⟩-LRCD repeats represents the number of occurrences of that repeat in the document. The repeat may be identified as present in the document, even if the contexts are different from those employed in identifying the repeat as an ⟨x,y⟩-LRCD repeat. As will be appreciated, the ⟨x, y⟩-LRCD repeat may be identified in a document even if the repeat does not occur more than once in that document and does not satisfy the values of x and y within the document itself.

In some embodiments, the vectorial representation may be normalized, for example so that all values sum to 1, or so that the sum of their square roots is 1.

The vectorial representation may be relatively sparse, depending on the length of the document and the size of the collection.

2. Classifier Learning and Classification

Documents may be classified based on their vectorial representation of repeats using a trained classifier. Classifier learning can be performed with any suitable non-linear or linear learning method. Such classifier systems are well known and can be based, for example, on a variety of training algorithms, such as, for example: linear discriminants such as linear least squares, Fisher linear discriminant or Support Vector Machines (SVM); decision trees; K-nearest neighbors (KNN); neural networks, including multi-layer perceptrons (MLP) and radial basis function (RBF) networks; and probabilistic generative models based e.g., on mixtures (typically Gaussian mixtures). An exemplary classifier may include a multiclass classifier or a set of binary classifiers, each trained on a respective one of the categories (labels) in a set. Training data includes labeled documents and their respective vectorial representations, generated in the same manner. In the exemplary embodiment, the training data may form a part of the document in the collection.

In one exemplary embodiment, Support Vector Machines (SVMs) can be used for multi-class training data. Exemplary SVM algorithms and the mapping convergence methods are discussed in Chidlovskii, et al., U.S. Pub. No. 2011/0103682, incorporated herein by reference.

3. Clustering/Generating Most Probable Words in Collection of Documents

The exemplary repeat-based representations can be as an input in a probabilistic topic (clustering) model. In one embodiment, the exemplary ⟨x, y⟩-LRCD repeats are used as input features in a clustering component, such as a Latent Dirichlet Allocation (LDA) model. In another embodiment, only right and left-context unique occurrences of repeats are used in the clustering model. The output of such a model may be a set of the most probable repeats for each of a set of topics. See, for example, Blei, et al., and U.S. application Ser. No. 13/437,079, filed Apr. 4, 2012, entitled FULL AND SEMI-BATCH CLUSTERING, by Matthias Galle and Jean-Michel Renders, the disclosures of which are incorporated herein by reference, for details on exemplary clustering algorithms which can be used with text documents.

4. Similarity Between Documents

The similarity between two repeats-based feature vectors 70 representing two documents can then be defined as their negative L1 or L2 distance. In one embodiment, a simple dot product or cosine similarity between vectors can be used as the similarity measure between two documents.

As will be appreciated the uses of the exemplary repeats-based representation 70 are not limited to those mentioned herein.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart method shown in FIG. 2, can be used to implement the method described herein.

The method illustrated in FIGS. 3 and 4 may be implemented in a computer program product or products that may be executed on a computer. The computer program product may be a non-transitory computer-readable recoding medium on which a control program is recorded, such as a disk, hard drive, or the like configured for performing the method. Common forms of computer-readable media include, for example, floppy discs, flexible discs, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12, (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media as a transmittable carrier wave in which the control program is embodied as a data signal using transmission media, such as acoustic or light waves, such as those generated during radio wave and infrared communications, and the like.

Most grammatical inference algorithms approach the problem of constructing grammatical rules by separating the problem into two tasks: the first task focuses on how to select the constituent parts of the grammar (the spans of what will become the non-terminals of the grammar) and the second task focuses on how to relate these constituent parts to each other. This separation can be found in state-of-the-art practical inference algorithms, like ADIOS and ABL. The present system provides a more flexible approach which permits spans of varying lengths and a computationally inexpensive algorithm to compute them.

Without intending to limit the scope of the exemplary embodiment, the following example illustrates the applicability of the method.

EXAMPLE

The Penntree-bank collection, a collection of parsed English sentences, was used to test the capacity of ⟨x, y⟩-LRCD repeats to capture semantic blocks. In the collection, each sentence is annotated with parentheses which denote the phrase-structure of the sentence (how the underlying constituent grammar generated it). The sentences were also part of speech (POS) tagged with 36 different POS-tags. Parentheses spanning single words and whole sentences were filtered out, leaving 697,080 constituents, corresponding to 325,069 different strings. Of these, only 17% are repeated substrings but they make up 61% of the total constituents.

Because the goal is not to decide at which positions a substring becomes a constituent, but rather if a substring is used or not as constituent or not, a modified version of the $F_1$ measure was used to compensate for the fact that some substrings appear very often. The percentage of retrieved substrings that are used at least once as constituents was used as precision. A weighted version was used for recall: each constituent was multiplied by the number of times it appeared as a constituent. This corresponds to an optimistic version which assumes the best case—that all constituents corresponding to a given substring are correctly identified. By focusing on repeated substrings, this means that the maximal recall that can be obtained on the Penntree bank is 61%.

Figure 5:
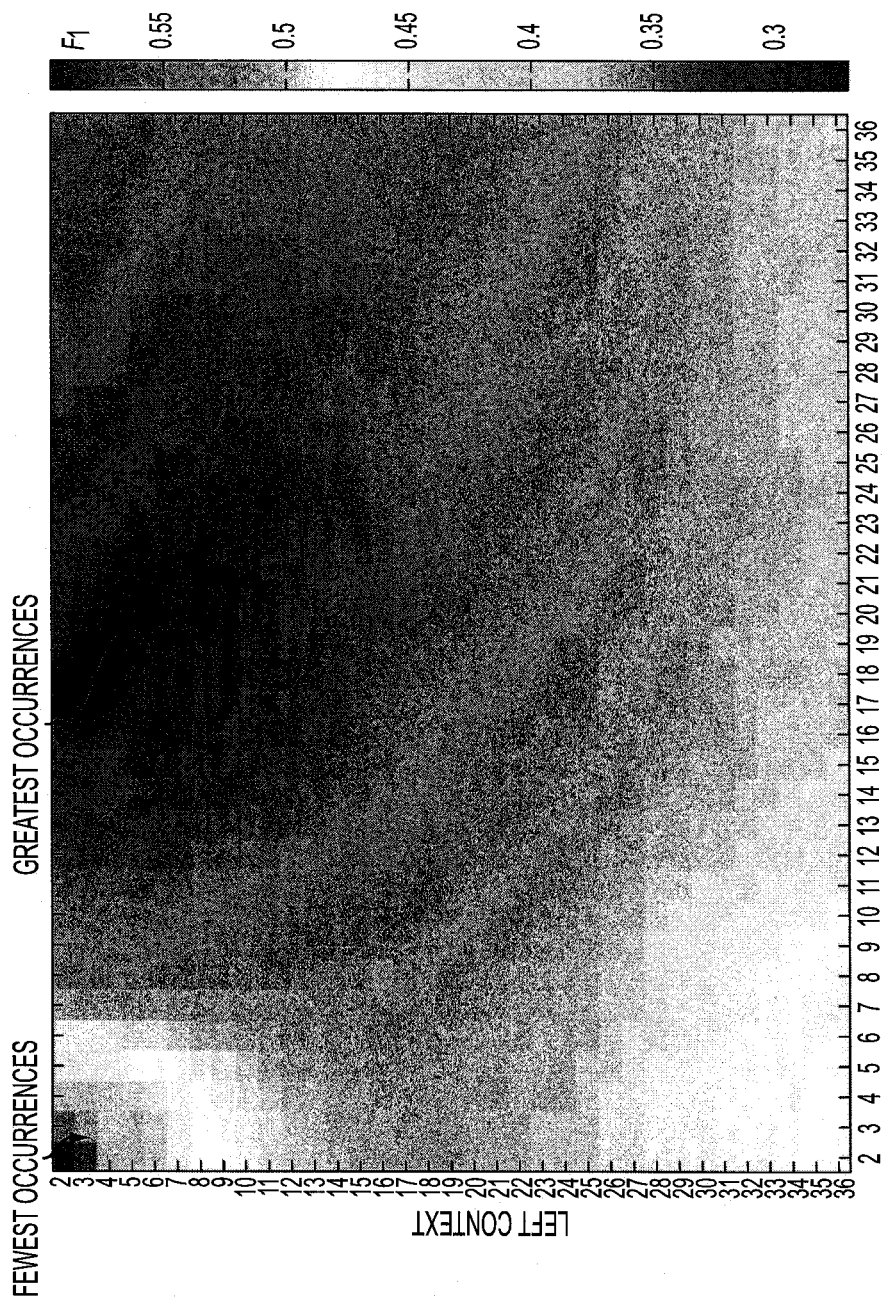
FIG. 5 shows a weighted $F_1$ distribution for different values of $\langle x, y \rangle$.
Figure 6:
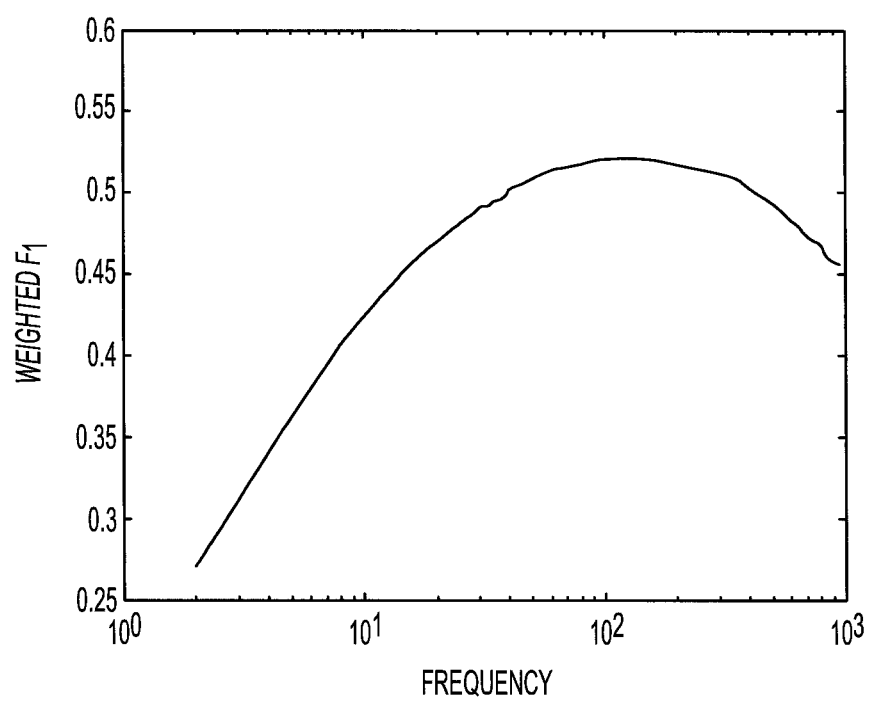
FIG. 6 is a plot showing a weighted $F_1$ (y-axis) distribution versus maximal repeats that appear at least k times (x-axis).

FIG. 5 plots this measure against different values of x (left context on the vertical axis) and y (right context on the horizontal axis). Note that the upper left corner corresponds to the case of maximal repeats. For super-maximal repeats (not depicted as the value of x and y depends on the particular word) the value is 0.047. For largest-maximal repeats, the value is 0.27. Note that part of the increase when the context increases could be explained simply by the fact that more frequent substrings are more likely to be constituents (see FIG. 6). However, this does not explain the asymmetry between the left and right context. Note that while a higher diversity in context increases the score in general, there seems to be a higher dependency on the right context than the left one. $\langle x, y \rangle$-LRCD repeats offer a principled way of capturing this asymmetry, i.e. different values of x and y can be selected in the method.

Finally, due to the roof imposed by the maximal value of recall, the $F_1$ value is actually indicating a high precision score (0.84 at the best $F_1$ value, and increasing up to 0.97 at the right border).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of identifying repeat subsequences of symbols in a sequence of symbols comprising:
   receiving a sequence of symbols drawn from an alphabet, the sequence of symbols being generated from a collection of at least two documents;
   defining values of x and y, where x corresponds to a threshold number of different left contexts for a given repeat subsequence in the sequence and y corresponds to a threshold number of different right contexts for a given repeat subsequence in the sequence to be identified as context diverse;
   generating a lexicographically sorted array of suffixes in the sequence;
   computing a longest common prefix array, each value in the longest common prefix array representing a length, in symbols, of a longest common prefix that occurs in an adjacent pair of suffixes in the lexicographically sorted array;
   sequentially comparing pairs of first and second longest common prefix values that are sequential in the longest common prefix array and, based on the comparison, identifying at least one of:
      an occurrence of a same repeat subsequence, when the compared first and second longest common prefix values are the same;
      a new occurrence of a longer repeat subsequence when the second of the compared longest common prefix values is higher; and
      a last occurrence of a given repeat subsequence when the second of the compared longest common prefix values is lower;
   based on the sequential comparisons, identifying context diverse repeat subsequences in the sequence, each of the identified context diverse repeat subsequences having at least the defined threshold number of different left and right contexts; and
   outputting information based on the identified context diverse repeat subsequences, the output information including at least one of:
      a set of repeat subsequences which includes the identified context diverse repeat subsequences;
      a vector spaced representation of a document in the collection, the vector spaced representation including indices, each index representing a number of times a respective one of a set of repeat subsequences appears in the document, the set of repeat subsequences including the identified context diverse repeat subsequences;
      a label for a document in the collection, the label being based on the vector spaced representation of the document;
      for each of a set of topics, a set of most probable repeat subsequences from a set of repeat subsequences which includes the identified context diverse repeat subsequences; and
      a cluster of similar documents in the collection, or a set of documents similar to a selected document, based on a measure of similarity between respective vector spaced representations;
   wherein at least one of the generating, computing, comparing, and identifying is performed by a computer processor.

2. The method of claim 1, wherein the sequential comparison comprises:
   based on the values in the longest common prefix array, constructing a set of left contexts by inserting in the set a symbol appearing in the sequence, which precedes a suffix;
   based on a pair of sequential values in the longest common prefix array, incrementing a count of right contexts; and
   outputting context diverse repeat subsequences having a cardinality of the left context set of at least x and a count of at least y.

3. The method of claim 1, wherein the sequential comparison comprises comparing a pair of sequential values in the longest common prefix array comprising a first and a second value, and if the second value is less than the first value, the left context set and the right context count of an occurrence of a repeat subsequence at a corresponding location in the suffix array are computed, and if the cardinality is greater than value x and the count greater than value y, outputting the occurrence.

4. The method of claim 3, wherein if the second value is greater than the first value, the method comprises adding an occurrence of a new repeat to a data structure.

5. The method of claim 1, wherein the symbols correspond to at least one of the group consisting of:
single characters of an alphabet that includes letters;
words in at least one document in a natural language; and
part of speech tags assigned to words at least one document in a natural language.

6. The method of claim 1, wherein x and y have different values.

7. The method of claim 1, wherein at least one of x and y is at least 2 and wherein the other of x and y is greater than 2.

8. The method of claim 1, further comprising computing a value for at least one of x and y based on a training set of sequences of symbols.

9. The method of claim 1, further comprising providing for a user to select a value for at least one of x and y.

10. The method of claim 1, further comprising generating a representation of at least one document in a collection of documents from which the sequence is extracted based on occurrences of the identified repeat subsequences.

11. A method of identifying repeat subsequences of symbols in a sequence of symbols comprising:
receiving a sequence of symbols drawn from an alphabet;
defining values of x and y, where x corresponds to a threshold number of different left contexts for a given repeat subsequence in the sequence and y corresponds to a threshold number of different right contexts for a given repeat subsequence in the sequence to be identified as context diverse;
generating a lexicographically sorted array of suffixes in the sequence;
computing a longest common prefix array, each value in the longest common prefix array representing a length, in symbols, of a longest common prefix that occurs in an adjacent pair of suffixes in the lexicographically sorted array;
sequentially comparing pairs of first and second sequential longest common prefix values and, based on the comparison, identifying at least one of:
an occurrence of a same repeat subsequence, when the compared first and second longest common prefix values are the same;
a new occurrence of a longer repeat subsequence when the second of the compared longest common prefix values is higher; and
a last occurrence of a given repeat subsequence when the second of the compared longest common prefix values is lower,
wherein the sequential comparison comprises:
comparing a pair of sequential values in the longest common prefix array comprising a first and a second value, and if the second value is less than the first value, the left context set and the right context count of an occurrence of a repeat subsequence at a corresponding location in the suffix array are computed;
computing the left context set and the right context count for all subsequences of the occurrence which have a length greater than the first longest common prefix value; and
for each subsequence, outputting the subsequence if the corresponding cardinality of the left context set is greater than value x and right context count is greater than value y;

wherein at least one of the generating, computing, comparing, and identifying is performed by a computer processor.

12. A method of identifying repeat subsequences of symbols in a sequence of symbols comprising:
receiving a sequence of symbols drawn from an alphabet;
defining values of x and y, where x corresponds to a threshold number of different left contexts for a given repeat subsequence in the sequence and y corresponds to a threshold number of different right contexts for a given repeat subsequence in the sequence to be identified as context diverse;
generating a lexicographically sorted array of suffixes in the sequence;
computing a longest common prefix array, each value in the longest common prefix array representing a length, in symbols, of a longest common prefix that occurs in an adjacent pair of suffixes in the lexicographically sorted array;
sequentially comparing pairs of first and second longest common prefix values that are sequential in the longest common prefix array, wherein at least one of:
if the second value is equal to the first value, the count of the right context is incremented and a symbol preceding a suffix in the sequence is added to the left context set if that symbol is not already in the left context, the suffix corresponding to the pair of longest common prefix values; and
if the second value is greater than the first value, an occurrence of a new repeat is added to a data structure;
based on the comparison, identifying at least one of:
an occurrence of a same repeat subsequence, when the compared first and second longest common prefix values are the same;
a new occurrence of a longer repeat subsequence when the second of the compared longest common prefix values is higher; and
a last occurrence of a given repeat subsequence when the second of the compared longest common prefix values is lower,
wherein at least one of the generating, computing, comparing, and identifying is performed by a computer processor.

13. A method of identifying repeat subsequences of symbols in a sequence of symbols comprising:
receiving a sequence of symbols drawn from an alphabet;
defining values of x and y, where x corresponds to a threshold number of different left contexts for a given repeat subsequence in the sequence and y corresponds to a threshold number of different right contexts for a given repeat subsequence in the sequence to be identified as context diverse;
generating a lexicographically sorted array of suffixes in the sequence;
computing a longest common prefix array, each value in the longest common prefix array representing a length, in symbols, of a longest common prefix that occurs in an adjacent pair of suffixes in the lexicographically sorted array;
sequentially comparing pairs of first and second longest common prefix values that are sequential in the longest common prefix array, the sequential comparison comprising computing the cardinality of a right context and a set of left contexts for each of a set of repeat subsequences in the sequence by traversing the suffix array and longest common prefix array, tracking each repeat with a tuple data structure, and, for a current suffix, comparing a current longest common prefix value to a sequentially next longest common prefix value and performing at least one of:

if the next longest common prefix value is less than the current longest common prefix value, then computing the left and right contexts of the current suffix and all subsequences of the suffix that are also repeat subsequences which are longer than the next longest common prefix value;

if the next longest common prefix value equals the current longest common prefix value, then adding a character to the left of the current suffix to the set of left contexts and incrementing the cardinality of the right context; and if the next longest common prefix value is greater than the current longest common prefix value, creating a new tuple data structure and storing the left context of the current suffix in the new tuple data structure;

based on the sequential comparisons, identifying context diverse repeat subsequences in the sequence, each of the identified context diverse repeat subsequences having at least the defined threshold number of different left and right contexts; and outputting information based on the identified context diverse repeat subsequences, the output information including at least one of:

a set of repeat subsequences which includes the identified context diverse repeat subsequences;

a vector spaced representation of a document in a collection from which the sequence of symbols is generated, the vector spaced representation including indices, each index representing a number of times a respective one of a set of repeat subsequences appears in the document, the set of repeat subsequences including the identified context diverse repeat subsequences;

a label for a document in the collection, the label being based on the vector spaced representation of the document;

for each of a set of topics, a set of most probable repeat subsequences from a set of repeat subsequences which includes the identified context diverse repeat subsequences; and a cluster of similar documents in the collection, or a set of documents similar to a selected document, based on a measure of similarity between respective vector spaced representations;

wherein at least one of the generating, computing, comparing, and identifying is performed by a computer processor.

14. A computer program product comprising non-transitory storage medium storing instructions, which when executed by a processor, perform the method according to claim 1.

15. A system comprising memory which stores instructions for performing the method of claim 1 and a computer processor, in communication with the memory, which performs the method.

16. A system for detecting repeat subsequences in a sequence comprising:

a suffix array generator which generates a lexicographically sorted suffix array from an input sequence of symbols;

a longest common prefix array generator which generates a longest common prefix array based on the lexicographically sorted suffix array; and a repeat detector which:

receives the input sequence of symbols, the sorted suffix array, the longest common prefix array, a value x, and a value y, where x corresponds to a threshold number of different left contexts for a given repeat subsequence in the sequence and y corresponds to a threshold number of different right contexts for a given repeat subsequence in the sequence, wherein at least one of x and y is at least 2 and wherein the other of x and y is greater than 2;

identifies repeat subsequences in the sequence based on the longest common prefix array, the identifying including sequentially comparing pairs of first and second longest common prefix values that are sequential in the longest common prefix array;

for each repeat subsequence, constructs a left context set based on the longest common prefix array;

for each repeat subsequence, counts a number of right contexts; and identifies context diverse repeat subsequences comprising repeat subsequences having a cardinality of the left context set which is at least x and a count which is at least y;

an output interface which outputs information based on the identified context diverse repeat subsequences; and a processor which implements the suffix array generator, the longest common prefix array generator, and the repeat detector.

17. The system of claim 16, further comprising a preprocessor which generates the input sequence of symbols from a document collection.

18. The system of claim 17, wherein the preprocessor generates the input sequence of symbols from a document collection by replacing words in the document with part of speech tags.

19. The system of claim 17, wherein the preprocessor generates the input sequence of symbols from a document collection based on an alphabet of symbols.

20. The system of claim 17, further comprising a user interface for inputting a selection of at least one of x and y.

21. The system of claim 16, wherein the output information includes at least one of:

a set of repeat subsequences which includes the identified context diverse repeat subsequences;

a vector spaced representation of a document in the collection, the vector spaced representation including indices, each index representing a number of times a respective one of a set of repeat subsequences appears in the document, the set of repeat subsequences including the identified context diverse repeat subsequences;

a label for a document in the collection, the label being based on the vector spaced representation of the document;

for each of a set of topics, a set of most probable repeat subsequences from a set of repeat subsequences which includes the identified context diverse repeat subsequences; and a cluster of similar documents in the collection, or a set of documents similar to a selected document, based on a measure of similarity between respective vector spaced representations.

22. A method for representing a document comprising:

receiving a collection of documents;

generating a sequence of symbols in an alphabet based on text of the documents;

providing for independently defining values of x and y, where x corresponds to a threshold number of different left contexts for a given repeat subsequence in the sequence and y corresponds to a threshold number of different right contexts for a given repeat subsequence in the sequence;

processing the sequence to identify repeat subsequences, each comprising at least one symbol, and incrementally identifying those of the repeat subsequences in the sequence which have left and right contexts of at least x and y, respectively as a class of context diverse repeat subsequences;

for a document in the collection, representing the document based on occurrences of repeat subsequences in the document that are in the class of context diverse repeat subsequences; and outputting the representation of the document or information based thereon, wherein at least one of the generating, providing, processing, and representing is performed by a computer processor.

23. The method of claim 22, wherein the output information includes at least one of:

a set of repeat subsequences which includes the identified context diverse repeat subsequences;

a vector spaced representation of a document in the collection, the vector spaced representation including indices, each index representing a number of times a respective one of a set of repeat subsequences appears in the document, the set of repeat subsequences including the identified context diverse repeat subsequences;

a label for a document in the collection, the label being based on the vector spaced representation of the document;

for each of a set of topics, a set of most probable repeat subsequences from a set of repeat subsequences which includes the identified context diverse repeat subsequences; and a cluster of similar documents in the collection, or a set of documents similar to a selected document, based on a measure of similarity between respective vector spaced representations.

* * * * *